US009673012B2

(12) United States Patent
Beckert et al.

(10) Patent No.: US 9,673,012 B2
(45) Date of Patent: Jun. 6, 2017

(54) LOW-CURRENT FUSE STAMPING METHOD

(71) Applicant: LITTELFUSE, Inc., Chicago, IL (US)

(72) Inventors: James J. Beckert, Rolling Meadows, IL (US); Gregory G. Stumpo, Schaumburg, IL (US); Stephen R. Shierry, Villa Park, IL (US)

(73) Assignee: Littelfuse, Inc., Chicago, IL (US)

( * ) Notice: Subject to any disclaimer, the term of this patent is extended or adjusted under 35 U.S.C. 154(b) by 116 days.

(21) Appl. No.: 14/381,701

(22) PCT Filed: May 16, 2013

(86) PCT No.: PCT/US2013/041373
§ 371 (c)(1),
(2) Date: Aug. 28, 2014

(87) PCT Pub. No.: WO2013/173594
PCT Pub. Date: Nov. 21, 2013

(65) Prior Publication Data

US 2015/0054615 A1 Feb. 26, 2015

Related U.S. Application Data

(60) Provisional application No. 61/647,855, filed on May 16, 2012.

(51) Int. Cl.

| | |
|---|---|
| ***B21D 33/00*** | (2006.01) |
| ***B23B 37/00*** | (2006.01) |
| ***H01H 69/02*** | (2006.01) |
| ***H01H 85/06*** | (2006.01) |
| ***H01H 85/08*** | (2006.01) |
| ***H01H 85/50*** | (2006.01) |
| *H01H 85/041* | (2006.01) |
| *H01H 85/055* | (2006.01) |

(52) U.S. Cl.
CPC ............ *H01H 69/02* (2013.01); *H01H 85/06* (2013.01); *H01H 85/08* (2013.01); *H01H 85/50* (2013.01); *H01H 85/0417* (2013.01); *H01H 85/055* (2013.01); *Y10T 29/302* (2015.01); *Y10T 29/49107* (2015.01)

(58) Field of Classification Search
CPC H01L 23/5256; H01H 69/02; H01H 85/0411; H01H 85/048; H01H 85/055; H01H 85/50; Y10T 29/49107; Y10T 29/49101; Y10T 29/49204
USPC ......... 29/17.3, 623, 874; 337/159, 160, 198, 337/296, 297
See application file for complete search history.

(56) References Cited

U.S. PATENT DOCUMENTS 3,114,993 A 12/1963 Monkcom
4,315,235 A * 2/1982 Jacobs, Jr. ............. H01H 85/08 337/161

(Continued)

*Primary Examiner* — Thiem Phan

(57) ABSTRACT

A convenient, cost-effective method for manufacturing low-current fuse elements. The method may include the steps of stamping a substrate out of a sheet of material and stamping at least one hole in the substrate. The method may further include the steps of bonding a layer of fuse material to a surface of the substrate with a portion of the fuse material covering the hole, stamping a fuse element out of the portion of fuse material covering the hole, and separating an individual fuse from the fuse material and the substrate. A low-current fuse can thereby be obtained using an easily performed stamping process.

12 Claims, 5 Drawing Sheets

(56) References Cited

U.S. PATENT DOCUMENTS

| | | | | |
|---|---|---|---|---|
| 5,898,357 | A * | 4/1999 | Endo | H01H 85/11 337/159 |
| 5,914,649 | A | 6/1999 | Isono et al. | |
| 5,929,741 | A | 7/1999 | Nishimura et al. | |
| 6,163,244 | A | 12/2000 | Endo et al. | |
| 6,622,375 | B1 | 9/2003 | Endo et al. | |
| 2004/0184211 | A1 | 9/2004 | Bender et al. | |

* cited by examiner

LOW-CURRENT FUSE STAMPING METHOD

FIELD OF THE DISCLOSURE

The disclosure relates generally to the field of circuit protection devices and more particularly to a method for manufacturing low-current fuses.

BACKGROUND OF THE DISCLOSURE

Automotive fuses are typically produced using conventional stamping processes wherein a fuse is punched out of a sheet of metal by an appropriately-shaped dye. Stamping is generally preferred to other fuse manufacturing methods because it is a relatively low cost process that produces a high-quality product. However, it is extremely difficult to produce low-current fuse elements using stamping processes because such elements must generally be very narrow and very thin. Stamping such thin materials often results in damage to portions of the material that must remain intact. Thus, in order to achieve the requisite dimensions for low-current fuse elements, skiving or coining methods are commonly employed. While these methods are capable of producing fuse elements that are thin and narrow, they are extremely difficult to employ and are themselves prone to material tear-through. It would therefore be advantageous to provide a method for manufacturing low-current fuse elements that offers the ease and low cost of stamping processes.

SUMMARY

In accordance with the present disclosure, a convenient, cost-effective method for manufacturing high-quality, low-current fuse elements is provided. The method may include the steps of stamping a base metal blank out of a sheet of material and stamping at least one hole in the base metal blank. The method may further include the steps of bonding a layer of fuse material to a surface of the base metal blank with a portion of the fuse material covering the hole, stamping a fuse element out of the portion of fuse material covering the hole, and separating an individual fuse from the fuse material and the base metal blank. A low-current fuse can thereby be obtained using an easily performed, low-cost stamping process.

Additional methods may include stamping a base blank out of a nonconductive material and stamping at least one hole in the base blank. The method may further include the steps of bonding a layer of fuse material to a surface of the base blank with a portion of the fuse material covering the hole, stamping a fuse element out of the portion of fuse material covering the hole, and separating an individual fuse from the fuse material and the base blank. A low-current fuse can thereby be obtained using an easily performed, low-cost stamping process.

A low-current fuse comprising a first fuse terminal formed from a first terminal layer bonded about a first lateral edge of a substrate, a second fuse terminal formed from a second terminal layer bonded about a second lateral edge of a substrate, and a fuse element formed from a conductive foil bonded to a surface of the substrate, the fuse element electrically connecting the first and second fuse terminals, the fuse element formed from stamping the conductive foil after the conductive foil has been bonded to the substrate are also disclosed.

BRIEF DESCRIPTION OF THE DRAWINGS

By way of example, specific embodiments of the disclosed device will now be described, with reference to the accompanying drawings, in which.

DETAILED DESCRIPTION

Figure 1A:
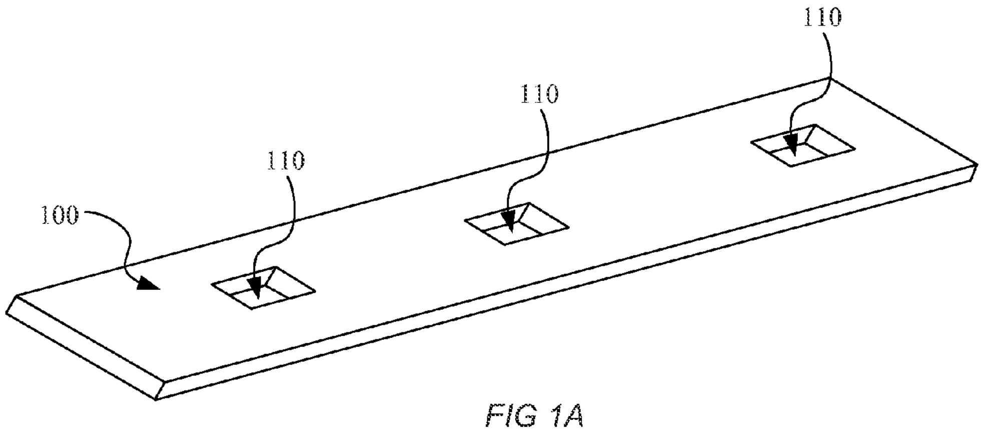
FIGS. 1A-1D are block diagrams of a fuse stamped from a bonded conductive foil and base metal blank.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

FIG. 1A illustrates a block diagram of a base metal blank 100. The base metal blank 100 may be stamped out of a larger sheet of material (not shown), such as a sheet of aluminum or other metal, using a conventional stamping process that will be familiar to those of ordinary skill in the art. The sheet of material may have a thickness that facilitates conventional stamping of the material. In some examples, the base metal blank 100 may have a thickness of about 0.75 mm. The base metal blank 100 may have a width that is substantially equal to the width of a desired fuse and a length that is at least as long as the length of a desired fuse. In some examples, the length of the base metal blank 100 may be at least as long as the length of several desired fuses.

As depicted, the base metal blank 100 has holes 110 therein. The holes 110 may be stamped in the base metal blank 100 using a conventional stamping process that will be familiar to those of ordinary skill in the art. The position of the holes 110 relative to the lateral edges of the base metal blank 100 may correspond to the position of a fuse element of a desired fuse relative to the lateral edges of the desired fuse. The holes 110 are longitudinally spaced apart from one another a distance that is at least as great as the length of a desired fuse. The holes 110 may have an area at least as large as the area of a fuse element of a desired fuse. In some examples, the width of the holes 110 may be about 3 mm and the length of the holes 110 may be about 4 mm. As depicted, the shape of the holes 110 is square. It is to be appreciated, that the shape of the holes 200 may be changed to suite various geometries and areas of the fuse element of a desired fuse without departing from the scope of the present disclosure.

Figure 1B:
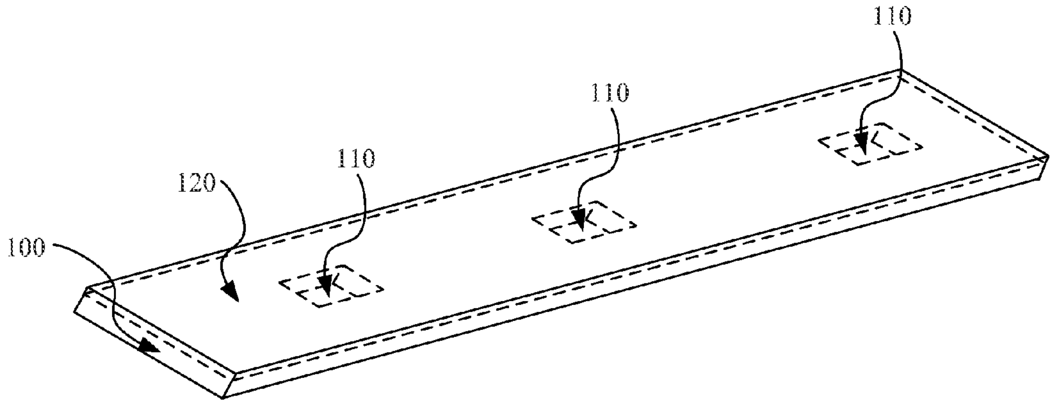

FIG. 1B illustrates a block diagram of the base metal blank 100 having a conductive foil 120 bonded thereto. As depicted, the conductive foil 120 is bonded to the top surface of the base metal blank 100. In some examples, the conductive foil 120 may be a thin strip of copper. As depicted, the conductive foil 120 covers the holes 110 in the base metal blank 100. The conductive foil 120 may have a thickness that is substantially equal to a thickness of a desired low-current fuse element, such as, for example, 0.05 mm. In some example, the low-current fuse may be configured to have a maximum current capacity of less than 2

Amps. Other material having suitable conductive and fuse properties may be substituted for the conductive foil 120 without departing from the scope of the present disclosure.

Figure 1C:
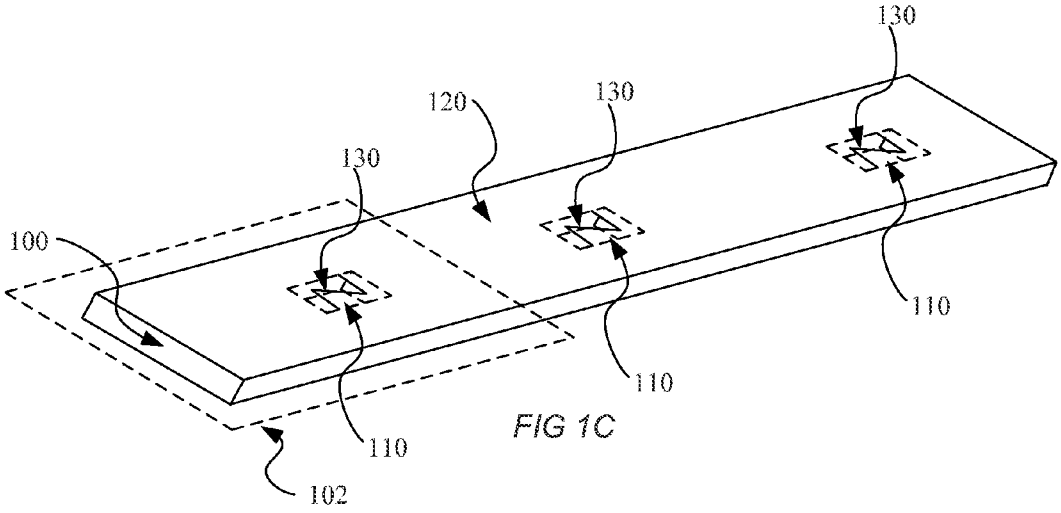

FIG. 1C illustrates the base metal blank 100 and the conductive foil 120 having fuse elements 130 stamped out of the conductive foil 120. In general, the fuse elements 130 may be stamped using an appropriate shaped dye. As depicted, the fuse elements 130 are stamped out of the conductive foil 120 over the holes 110. During such stamping, the base metal blank 100 provides the conductive foil 120 with a rigid backing and effectively thickens the portions of the conductive foil 120 that surround the fuse element 130 being stamped, thereby facilitating the application of a conventional stamping process that would be difficult of impossible to perform on the conductive foil 120 alone. More specifically, the thickness of the conductive foil 120 is such that traditional stamping processes may tear the fuse element. The base metal blank 100, however, provides a rigid backing that enables the fuse elements 130 to be stamped out of the conductive foil 120 using conventional stamping processes.

As depicted, the fuse elements 130 are "Z" shaped. However, other fuse element geometries may be stamped out of the conductive foil 120 without departing from the scope of the present disclosure.

Figure 1D:
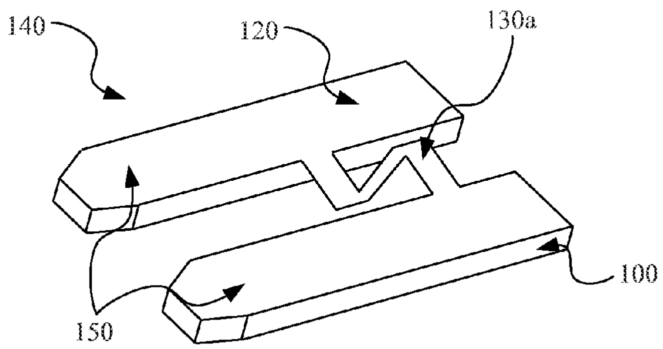

FIG. 1D illustrates an individual fuse 140 separated from corresponding portion 102 shown in FIG. 1C. In some examples, the individual fuse 140, including the corresponding portion of the base metal blank 100 and conductive foil 120 may be separated by cutting or clipping the base metal blank 100 and the conductive foil 120. As such, the individual fuse 140 having a low-current fuse element 130*a* and, optionally, associated fuse terminals 150, may be obtained. The base metal blank 100 material on the underside of the fuse 140 provides the fuse 140 with an additional amount of strength and support.

Figure 2A:
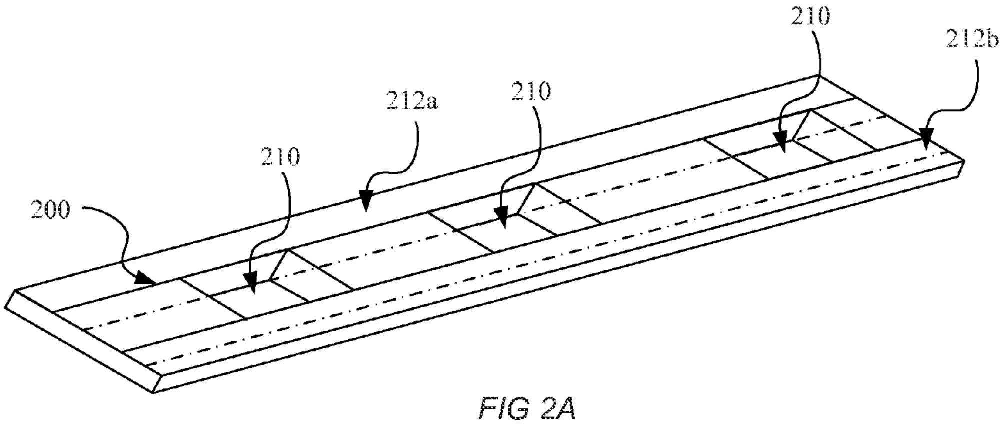
FIGS. 2A-2D are block diagrams of a fuse stamped from a bonded conductive foil and base blank.

FIG. 2A illustrates a block diagram of a substrate 200. The substrate 200 may be stamped out of a larger sheet of nonconductive material (not shown), such as a sheet of FR4 or other suitable substrate material, using a conventional stamping process that will be familiar to those of ordinary skill in the art. The sheet of material may have a thickness that facilitates conventional stamping of the material. In some examples, the substrate 200 may have a thickness of about 0.75 mm. The substrate 200 may have a width that is substantially equal to the width of a desired fuse and a length that is at least as long as the length of a desired fuse. In some examples, the length of the substrate 200 may be at least as long as the length of several desired fuses. As will be described more fully herein, the substrate 200 may be used a frame for a thin conductive material, which by itself may not have enough mechanical strength to facilitate stamping or otherwise manufacturing a fuse element from.

As depicted, the substrate 200 has holes 210 therein. The holes 210 may be stamped in the base blank 200 using a conventional stamping process that will be familiar to those of ordinary skill in the art. The position of the holes 210 relative to the lateral edges of the substrate 200 may correspond to the position of a fuse element of a desired fuse relative to the lateral edges of the desired fuse. The holes 210 are longitudinally spaced apart from one another a distance that is at least as great as the length of a desired fuse. The holes 210 may have an area at least as large as the area of a fuse element of a desired fuse. In some examples, the width of the holes 210 may be about 3 mm and the length of the holes 210 may be about 4 mm. As depicted, the holes 200 are square in shape. It is to be appreciated, that the shape of the holes 200 may be changed to suite various geometries and areas of the fuse element of a desired fuse without departing from the scope of the present disclosure.

The substrate 200 additionally has a first terminal layer 212*a* bonded around one edge of the substrate 200. As depicted, the first terminal layer 212*a* is bonded on the upper surface of the substrate 200, over a lateral edge of the substrate 200 and on the lower surface of the substrate 200. Furthermore, the first terminal layer 212*a* is depicted as starting at one lateral edge of the holes 210 on the upper surface of the substrate 200 and ending at the same lateral edge of the holes 210 on the lower surface. A second terminal layer 212*b* is also bonded around the other edge of the substrate 200. As depicted, the second terminal layer 212*b* is bonded on the upper surface of the substrate 200, over the other lateral edge of the substrate 200 and on the lower surface of the substrate 200. Furthermore, the second terminal layer 212*b* is depicted as starting at the other lateral edge of the holes 210 on the upper surface of the substrate 200 and ending at the same lateral edge of the holes 210 on the lower surface. In some examples, the terminal layers 212*a*, 212*b* may be a thin strip of copper, zinc, or other suitable conductive material.

Figure 2B:
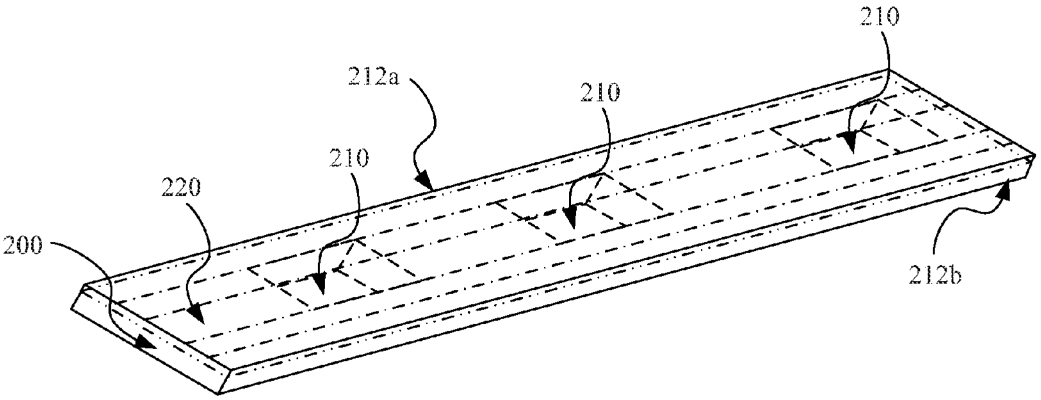

FIG. 2B illustrates a block diagram of the substrate 200 having a conductive foil 220 bonded thereto. As depicted, the conductive foil 220 is bonded to the top surface of the substrate 200, over the first and second terminal layers 212*a*, 212*b*. In some examples, the conductive foil 220 may be a thin strip of copper, zinc, or other conductive material having fuse element properties. As depicted, the conductive foil 220 covers the holes 210 in the substrate 200. The conductive foil 220 may have a thickness that is substantially equal to a thickness of a desired low-current fuse element, such as, for example, between 0.4 mm and 0.05 mm. In some example, the low-current fuse may be configured to have a maximum current capacity of less than 2 Amps. Other material having suitable conductive and fuse properties may be substituted for the conductive foil 220 without departing from the scope of the present disclosure.

Figure 2C:
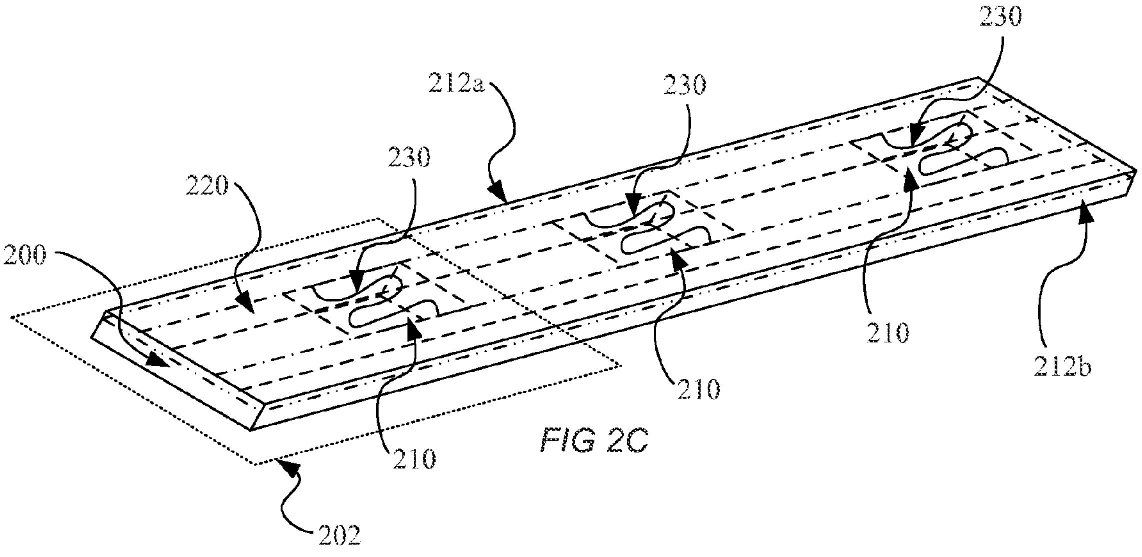

FIG. 2C illustrates the substrate 200 and the conductive foil 220 having fuse elements 230 stamped out of the conductive foil 220. In general, the fuse elements 230 may be stamped using an appropriate shaped dye. As depicted, the fuse elements 230 are stamped out of the conductive foil 220 over the holes 210. During such stamping, the substrate 200 provides the conductive foil 220 with a rigid backing and effectively thickens the portions of the conductive foil 220 that surround the fuse element 230 being stamped, thereby facilitating the application of a conventional stamping process that would be difficult of impossible to perform on the conductive foil 220 alone. More specifically, the thickness of the conductive foil 220 is such that traditional stamping processes may tear the fuse element. The substrate 200, however, provides a rigid backing that enables the fuse elements 230 to be stamped out of the conductive foil 220 using conventional stamping processes.

As depicted, the fuse elements 230 are "S" shaped. However, other fuse element geometries may be stamped out of the conductive foil 220 without departing from the scope of the present disclosure.

Figure 2D:
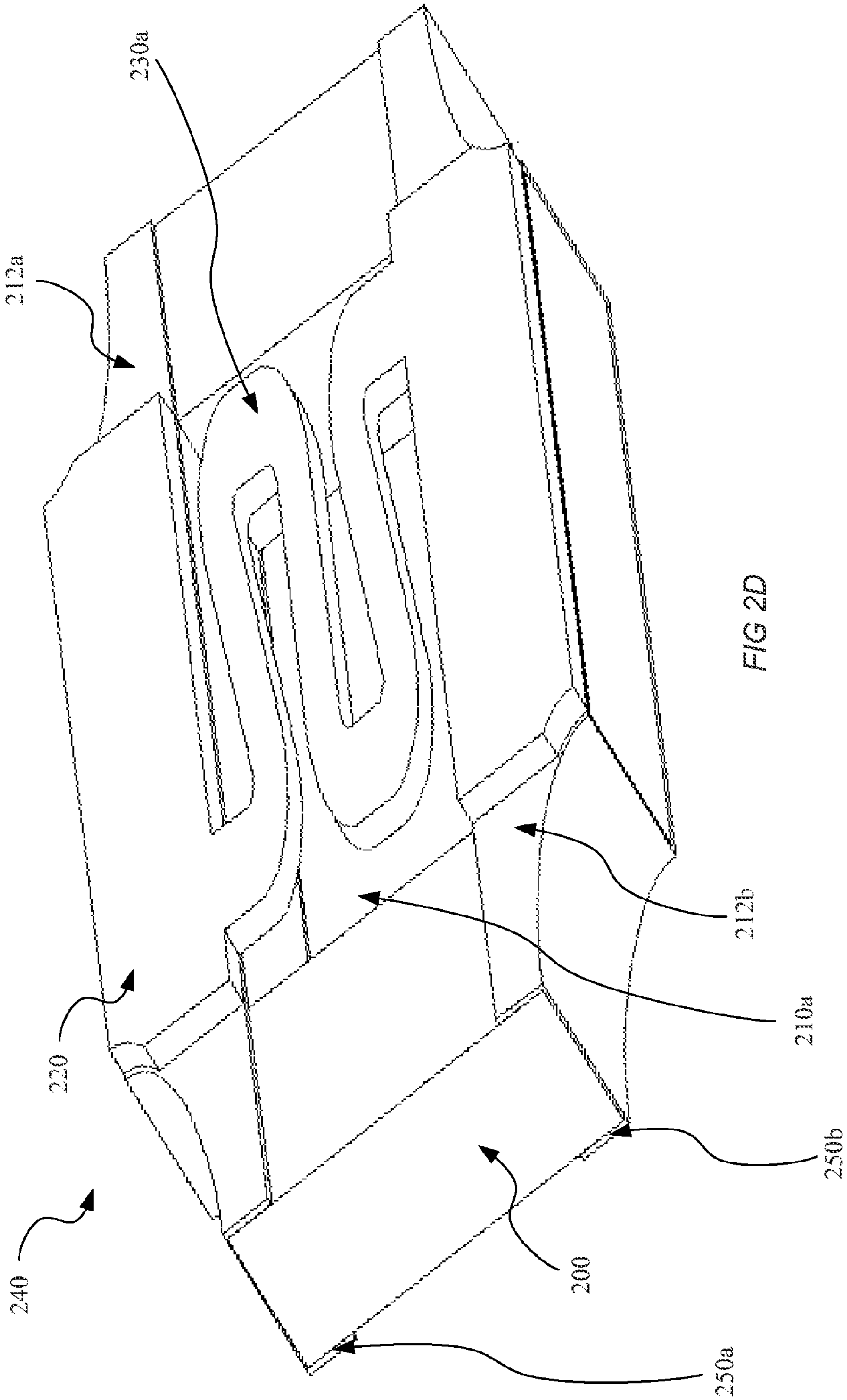

FIG. 2D illustrates an individual fuse 240 separated from a corresponding portion 202 shown in FIG. 2C. In some examples, the individual fuse 240, including the corresponding portion of the substrate 200, first and second terminal layers 212*a*, 212*b*, and conductive foil 220 may be separated by cutting or clipping fuse 240 from the corresponding portion 202. As such, the individual fuse 240 having a low-current fuse element 230*a* may be obtained. The substrate 200 material on the underside of the fuse 240 provides the fuse 240 with an additional amount of strength and support.

As depicted, the fuse element 230*a*, formed from the portion of the conductive foil 220, is disposed over the hole 210*a*. The substrate 200 material on the underside of the conductive foil 220 provides the fuse 240, and particularly, the fuse element 230*a*, with an additional amount of strength and support. Additionally, first and second terminal layers 212*a*, 212*b* provide first and second terminals 250*a*, 250*b*, respectively, for the fuse 240. In some examples, the fuse 240 may be a surface mount fuse. As such, the portions of the first and second terminal layers 212*a*, 212*b* bonded on the lower surface of the substrate 200, which form first and second terminals 250*a*, 250*b*, may provide electrical connection with a circuit to be protected in a surface mount application.

Figure 3:
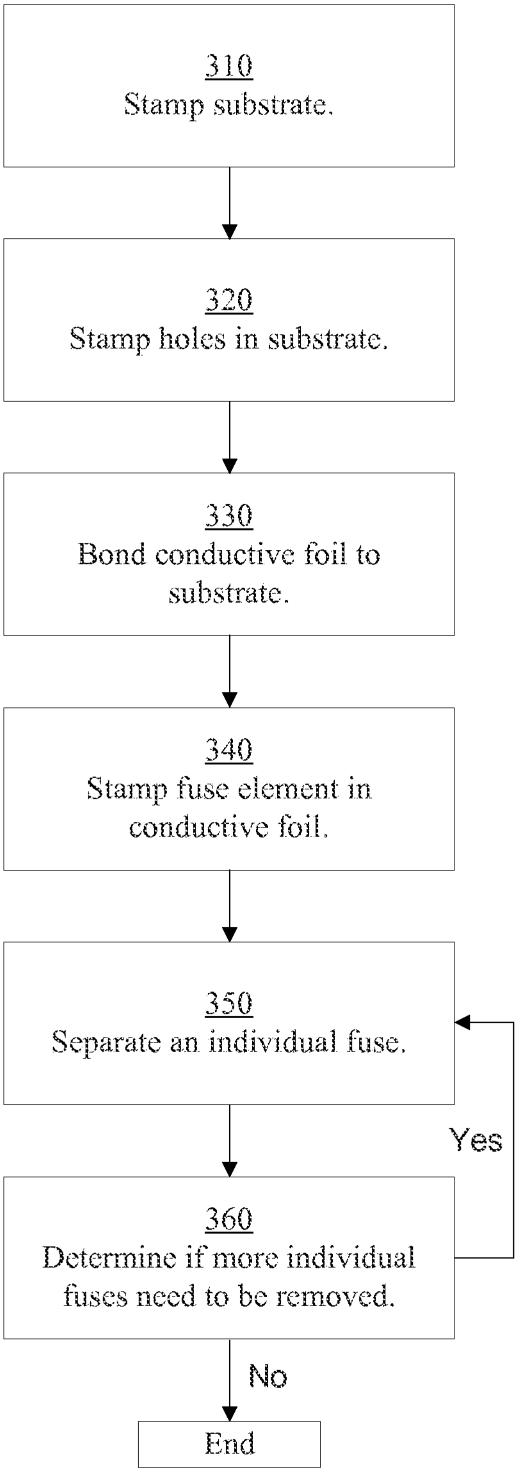
FIG. 3 is a flow chart illustrating a method of forming a fuse, all arranged in accordance with at least some embodiments of the present disclosure.

FIG. 3 is a flow chart illustrating a method 300 for forming a fuse, arranged in accordance with at least some embodiments of the present disclosure. In general, the method 300 is described with reference to FIGS. 2A-2D. It is to be appreciated, however, that the method 300 may also be used to manufacture the fuse 140 described with respect to FIGS. 1A-1D, or other fuses consistent with the present disclosure.

The method 300 may begin at block 310. At block 310, a substrate is stamped out of a larger sheet of material. For example, FIG. 2A shows the substrate 200, which may be stamped out of a larger sheet of material, such as, for example, aluminum, FR4, or other material, using a conventional stamping process that will be familiar to those of ordinary skill in the art.

Continuing from block 310 to block 320, a series of holes are stamped in the substrate. For example, FIG. 2A shows holes 210 stamped in the substrate 200. In some examples, blocks 310 and 320 may be performed simultaneously (e.g., using a single stamping operation, or the like). Continuing from block 320 to block 330, terminal layers may be bonded to the substrate 200. For example, FIG. 2A shows first terminal layer 212*a* may be bonded about a first lateral edge of the substrate 200 and on upper and lower surfaces of the substrate 200 adjacent to the first lateral edge. Similarly, second terminal layer 212*b* may be bonded about a second lateral edge of the substrate 200 and on upper and lower surfaces of the substrate 200 adjacent to the second lateral edge. In some examples, the terminal layers 212*a*, 212*b* may be a thin strip of copper. The terminal layers 212*a*, 212*b* may be bonded to the substrate 200 using an adhesive, such as, for example, "prepreg" or other appropriate bonding agent. In some examples, the terminal layers 212*a*, 212*b* may be bonded, laminated, or otherwise affixed to the surface of the substrate 200 using any suitable process or technique.

Continuing from block 320 to block 330, a conductive foil may be bonded to the substrate. For example, FIG. 2B shows conductive foil 220 bonded to the substrate 200. In some examples, the conductive foil 220 may be a thin strip of copper. The conductive foil 220 may be bonded to the substrate 200 using an adhesive, such as, for example, "prepreg" or other appropriate bonding agent. In some examples, the conductive foil 220 may be bonded, laminated, or otherwise affixed to the surface of the substrate 200 using any suitable process or technique. Furthermore, in embodiments where terminal layers 212*a*, 212*b* are bonded to the substrate 200, the conductive foil 220 may be bonded over the portions of the terminal layers 212*a*, 212*b* disposed on the same surface of the substrate to which the conductive foil 220 is bonded.

Continuing from block 330 to block 340, a fuse element may be stamped in the conductive foil. For example, FIG. 2C shows fuse elements 230 stamped out of the conductive foil 220. Continuing from block 340 to block 350, an individual fuse may be separated from a corresponding portion of the substrate. For example, FIG. 2D shows an individual fuse 240 separated from the corresponding portion 202 shown in FIG. 2C. In some examples, the individual fuse 240, including the corresponding portion of the substrate 200 and conductive foil 220 may be separated by cutting or clipping the substrate 200 and the conductive foil 220. As such, the individual fuse 240 having a low-current fuse element 230*a* and, optionally, associated fuse terminal 250, may be obtained.

Continuing from block 350 to block 360, a determination of whether more fuses need to be removed from the substrate 200 and the conductive foil 220 may be made. Based on the determination, the process may return to block 350, where another individual fuse may be separated from a corresponding portion of the substrate and conductive foil, or the process may end. In some examples, individual fuses (e.g., the fuse 240, or the like) may be separated iteratively as block 350 is repeatedly performed. With other examples, multiple individual fuses may be separated at once, such as, by stamping them out, or the like.

The invention claimed is:

1. A method for manufacturing a fuse comprising:
stamping a substrate out of a sheet of material;
stamping at least one hole in the substrate;
bonding a conductive foil to a surface of the substrate with a portion of the conductive foil covering the at least one hole;
stamping a fuse element out of the portion of the conductive foil covering the at least one hole; and
separating an individual fuse from the conductive foil and the substrate.

2. The method according to claim 1, wherein the substrate is nonconductive.

3. The method according to claim 1, further comprising:
bonding a first terminal layer about a first lateral edge of the substrate; and
bonding a second terminal layer about a second lateral edge of the substrate,
wherein the first terminal layer is bonded to an upper and lower surface of the substrate adjacent to the first lateral edge, the second terminal layer is bonded to the upper and lower surface of the substrate adjacent to the second lateral edge, and the conductive foil is bonded over a portion of the first and second terminal layer and electrically connects the terminal layer.

4. The method according to claim 1, wherein a plurality of holes are stamped in the substrate and the conductive foil is bonded to the surface of the substrate with corresponding portions of the conductive foil covering the plurality of holes.

5. The method according to claim 4, wherein the fuse element is a first fuse element stamped out of a first portion of the conductive foil covering a one of the plurality of holes, the method further comprising stamping a second fuse element out of a second portion of the conductive foil covering a different one of the plurality of holes.

6. The method according to claim 5, wherein the individual fuse is a first individual fuse, the method further comprising separating a second individual fuse from the conductive foil and the substrate.

7. The method according to claim 6, wherein the conductive foil is selected from the group consisting of copper and zinc.

8. The method according to claim 7, wherein the conductive foil has a thickness substantially between 0.4 mm and 0.05 mm.

9. The method according to claim 1, wherein separating an individual fuse from the conductive foil and the substrate includes clipping the fuse from portions of the substrate adjacent to the stamped fuse element.

10. The method according to claim 1, wherein bonding the conductive foil to the substrate includes applying an adhesive to the substrate and the conductive foil.

11. A method for manufacturing a fuse comprising:

stamping a base metal blank out of a sheet of material;

stamping a plurality of holes in the base metal blank;

bonding a conductive foil to a surface of the base metal blank with a plurality of portions of the conductive foil covering the plurality of holes;

stamping a fuse element in each of the plurality of portions of the conductive foil covering the plurality of holes; and separating an individual fuse from the conductive foil and the base metal blank, wherein the at least one individual fuse includes one of the plurality of stamped fuse elements.

12. The method according to claim 11, wherein the individual fuse if a first individual fuse, the method further comprising separating a second individual fuse from the conductive foil and the base metal blank, wherein the second individual fuse includes a different one of the plurality of stamped fuse elements than the first individual fuse.

* * * * *